United States Patent
Ayzenberg

(10) Patent No.: US 12,272,906 B2
(45) Date of Patent: Apr. 8, 2025

(54) HIGH PERFORMANCE CABLE TERMINATION

(71) Applicant: Amphenol Corporation, Wallingford, CT (US)

(72) Inventor: Mark M. Ayzenberg, Hudson, NH (US)

(73) Assignee: Amphenol Corporation, Wallingford, CT (US)

( * ) Notice: Subject to any disclaimer, the term of this patent is extended or adjusted under 35 U.S.C. 154(b) by 179 days.

(21) Appl. No.: 17/859,299

(22) Filed: Jul. 7, 2022

(65) Prior Publication Data

US 2023/0010530 A1    Jan. 12, 2023

Related U.S. Application Data

(60) Provisional application No. 63/220,212, filed on Jul. 9, 2021.

(51) Int. Cl.
*H01R 24/28* (2011.01)
*H01R 12/53* (2011.01)
(Continued)

(52) U.S. Cl.
CPC ............. *H01R 24/28* (2013.01); *H01R 12/53* (2013.01); *H01R 24/60* (2013.01); *H02G 1/14* (2013.01); *H02G 15/06* (2013.01)

(58) Field of Classification Search
None
See application file for complete search history.

(56) References Cited

U.S. PATENT DOCUMENTS 4,993,968 A * 2/1991 Guletsky .................. H01R 9/05
439/942
5,281,762 A    1/1994 Long et al.
(Continued)

FOREIGN PATENT DOCUMENTS

CN    105938945 A    9/2016
CN    110247235 A    9/2019
(Continued)

OTHER PUBLICATIONS

International Search Report and Written Opinion mailed Oct. 28, 2022 in connection with International Application No. PCT/US2022/036302.

(Continued)

*Primary Examiner* — Krystal Robinson
(74) *Attorney, Agent, or Firm* — Wolf, Greenfield & Sacks, P.C.

(57) ABSTRACT

A high frequency cable connector with a plug connector terminating shielded cables via a plurality of cable connection modules attached to a paddle card. The terminations do not significantly disrupt the high integrity signal paths within the cables, even at high frequencies. Various techniques may be used, alone or in combination, to form the termination, including that the wire insulators and shields of the cables extend almost to the point of termination, with a relatively small length of wire extending beyond the insulator and shield; welding of cable wires to signal terminals in the modules; signal terminals and ground terminals held within the modules with a controlled relative spacing; signal terminals of the modules surface mount soldered to pads on the paddle card; narrow pads approximating the width of traces in the paddle card; and short pads, approximating the length of mounting ends of the signal terminals.

19 Claims, 12 Drawing Sheets

(51) Int. Cl.
*H01R 24/60* (2011.01)
*H02G 1/14* (2006.01)
*H02G 15/06* (2006.01)

(56) References Cited

U.S. PATENT DOCUMENTS

| | | | | |
|---|---|---|---|---|
| 5,571,035 | A * | 11/1996 | Ferrill | H01R 24/64 |
| | | | | 439/894 |
| 6,380,485 | B1 * | 4/2002 | Beaman | H01R 13/6589 |
| | | | | 439/497 |
| 9,819,124 | B2 * | 11/2017 | Oberski | H01R 13/6469 |
| 9,882,293 | B1 * | 1/2018 | Chen | H01R 9/053 |
| 10,062,984 | B2 * | 8/2018 | Regnier | H01R 9/0515 |
| 10,193,268 | B1 * | 1/2019 | Chow | H01R 12/53 |
| 10,305,228 | B2 * | 5/2019 | Dang | H01R 13/623 |
| 11,177,594 | B2 * | 11/2021 | Green | G02B 6/4261 |
| 2013/0231011 | A1 * | 9/2013 | Sytsma | H01R 13/6591 |
| | | | | 439/723 |
| 2014/0120779 | A1 * | 5/2014 | Lloyd | H01R 13/502 |
| | | | | 439/660 |
| 2014/0187087 | A1 * | 7/2014 | Mason | H01R 13/6592 |
| | | | | 439/607.36 |
| 2014/0349496 | A1 | 11/2014 | Zhu et al. | |
| 2018/0287280 | A1 * | 10/2018 | Ratkovic | H01R 12/62 |
| 2020/0194911 | A1 | 6/2020 | Ayzenberg et al. | |
| 2020/0227850 | A1 * | 7/2020 | Do | H01R 13/2407 |
| 2020/0244025 | A1 * | 7/2020 | Winey | H01R 43/26 |

FOREIGN PATENT DOCUMENTS

| | | | | |
|---|---|---|---|---|
| KR | 10-1958096 B1 | | 3/2019 | |
| WO | WO-2013006592 A2 * | | 1/2013 | H01R 12/53 |

OTHER PUBLICATIONS

[No Author Listed], Specification for OSFP Octal Small Form Factor Pluggable Module. OSFP MSA. Rev 5.0. Oct. 2, 2022. 131 pages.

* cited by examiner

HIGH PERFORMANCE CABLE TERMINATION

CROSS-REFERENCE TO RELATED APPLICATIONS

This application claims priority to and the benefit of U.S. Provisional Application Ser. No. 63/220,212, filed on Jul. 9, 2021, entitled "HIGH PERFORMANCE CABLE TERMINATION." The contents of this application are incorporated herein by reference in their entirety.

BACKGROUND

The techniques described herein relate generally to electrical cables used to transmit signals between electronic devices, such as servers and routers.

Cables are often terminated at their ends with electrical connectors that mate with corresponding connectors on the electronic devices, enabling quick interconnection of the electronic devices.

A cable provides signal paths with high signal integrity, particularly for high frequency signals, such as those above 40 Gbps using a non-return-to-zero (NRZ) protocol, above 50 Gbps using a pulse amplitude modulation (PAM) protocol, and/or the like. Each cable has one or more signal conductors, which is surrounded by a dielectric material, which in turn is surrounded by a conductive layer. A protective jacket, often made of plastic, may surround these components. Additionally the jacket or other portions of the cable may include fibers or other structures for mechanical support.

The components of the cable that predominately impact signal propagation, i.e., the signal conductor, the dielectric and conductive layer, are generally uniform over the length of the cable. Non-uniformities on a signal path, such as might be created by changes in shape or material of the components, give rise to changes in impedance or promote mode conversion, which reduce signal integrity, as these effects are manifested as insertion loss, crosstalk or other undesirable effects.

The signal conductor, dielectric and conductive layer are flexible, giving rise to a desirable property of cables. The flexibility enables uniform cable properties to be maintained even if the cable is routed with many bends, promoting signal transmission with high integrity.

One type of cable, referred to as a "twinax cable," is constructed to support transmission of a differential signal and has a balanced pair of signal wires, is embedded in a dielectric, and encircled by a conductive layer. In addition to uniform dimensions of the signal wires over the length of the cable, the spacing of the wires relative to each other and to the conductive layer is maintained over the length of the cable because those components are positioned by the dielectric. Such a cable may be formed by extruding the dielectric around the signal wires.

The conductive layer is usually formed using foil, such as aluminized Mylar, or wire braid wrapped around the surface of the dielectric. The conductive layer influences the characteristic impedance in the cable and provides shielding that reduces crosstalk between signal conductors in twinax cables that may be routed together as a cable bundle. The conductive layer also forms the cable ground reference.

A twinax cable can also have a drain wire. Unlike a signal wire, which is generally coated with a dielectric to prevent electrical contact with other conductors in the cable, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The drain wire may be attached to a ground conductor in the terminating structure. In this way, any ground return path may be continued from the cable to the terminating structure.

SUMMARY

According to one aspect of the present application, a cable connector is provided. The cable connector may comprise a paddle card comprising a first surface, wherein the paddle card comprises a first plurality of pads and a second plurality of pads on the first surface; and at least one first cable connection module mounted to pads of the first plurality of pads and to pads of the second plurality of pads on the first surface of the paddle card. The at least one first cable connection module comprises: an insulative portion; at least one signal terminal supported by the insulative portion and comprising a mounting end and a wire attachment end, the mounting end mounted to a pad of the first plurality of pads and the wire attachment end comprising arm members extending away from the first surface of the paddle card, the arm members being configured to receive a wire of a cable therebetween; and a ground terminal supported by the insulative portion and comprising an arm coupled to a pad of the second plurality of pads and a portion configured for connection to a ground conductor of the cable.

In some embodiments, the ground terminal is disposed between the at least one signal terminal and the first surface of the paddle card.

In some embodiments, a portion of the at least one signal terminal and the ground terminal are embedded in the insulative portion.

In some embodiments, a cable assembly includes the cable connector in combination with a plurality of cables, each cable of the plurality of cables comprising at least one cable wire, wherein a cable wire of the at least one cable wire is electrically and mechanically connected to a wire attachment end of a signal terminal of the at least one signal terminal.

In some embodiments, the cable wire is fused to the wire attachment end of the signal terminal.

In some embodiments, the at least one signal terminal comprises two signal terminals; cables of the plurality of cables comprise two cable wires; and each of the two cable wires is electrically and mechanically connected to a signal terminal of the two signal terminals.

In some embodiments, the paddle card comprises a length that extends along a first direction; the first plurality of pads are disposed in a first row and the second plurality of pads are disposed in a second row, the first row and the second row extending along a second direction orthogonal to the first direction, and the first row is spaced from the second row in the first direction; and cables of the plurality of cables are aligned in parallel along the first direction and disposed side-by-side in the second direction.

In some embodiments, the paddle card comprises a second surface opposite the first surface, wherein the paddle card comprises a third plurality of pads and a fourth plurality of pads on the second surface; and the cable assembly further comprises at least one second cable connection module mounted to pads of the third plurality of pads and to pads of the fourth plurality of pads on the second surface of the paddle card.

In some embodiments, the cable connector further comprises an outer housing, wherein the paddle card is disposed within a cavity of the outer housing.

In some embodiments, the arm of the ground terminal is soldered to a pad of the second plurality of pads and the portion configured for connection to the ground conductor of the cable comprises a compliant portion.

In some embodiments, the arm of the ground terminal is a first compliant arm and makes a pressure contact to a pad of the second plurality of pads and the portion configured for connection to the ground conductor of the cable comprises a compliant portion.

According to another aspect of the present application, a cable assembly is provided. The cable assembly comprises: a plurality of cables, each of the plurality of cables comprising at least one wire and a shield; and a connector terminating the plurality of cables. The connector comprises: a substrate comprising a plurality of first pads and a plurality of second pads; a plurality of connection modules mounted on the substrate and coupled to a respective cable of the plurality of cables, wherein: each of the plurality of connection modules comprises at least one first terminal and a second terminal; a first end of each of the at least one first terminals is coupled to a respective first pad of the plurality of first pads; a first end of the second terminal is coupled to a respective second pad of the plurality of second pads; a second end of each of the at least one first terminals is coupled to a respective wire of the at least one wire of the respective cable; and a second end of the second terminal is coupled to the shield of the respective cable.

In some embodiments, the substrate is a paddle card comprising a plurality of contact pads disposed along an edge thereof.

In some embodiments, the first pads are signal pads and the second pads are ground pads.

In some embodiments, each of the plurality of cables comprises two wires and the shield surrounds the two wires; and each of the plurality of connection modules comprises two first terminals.

In some embodiments, each of the plurality of connection modules further comprises an insulative portion holding the at least one first terminal and the second terminal.

In some embodiments, each of the plurality of connection modules comprises an engagement feature extending from the insulative portion and into a hole in the substrate.

In some embodiments, for each of the plurality of connection modules, the first end of each of the at least one first terminals is electrically and mechanically coupled to a respective first pad of the plurality of first pads.

In some embodiments, for each of the plurality of connection modules: the at least one first terminals is a pair of first terminals; and the first end of each of the pair of first terminals is soldered to a respective first pad of the plurality of first pads.

In some embodiments, for each of the plurality of connection modules: the second end of the second terminal is coupled to the shield of the respective cable by pressing against the shield.

In some embodiments, the cable assembly further comprises at least one member urging the plurality of cables towards the respective connection modules of the plurality of connection modules.

In some embodiments, for each of the plurality of connection modules: the first end of the second terminal is coupled to the respective second pad of the plurality of second pads by pressing against the respective second pad.

In some embodiments, for each of the plurality of connection modules: the first end of the second terminal is soldered to the respective second pad of the plurality of second pads.

In some embodiments, the substrate comprises a first side and a second, opposite, side; a first subset of the plurality of connection modules are mounted to the first side and a second subset of the plurality of connection modules are mounted to the second side.

In some embodiments, the connector further comprises an outer housing enclosing a cavity; the substrate: is disposed within the cavity; and comprises a plurality of contact pads disposed along a first edge of the substrate; the first edge of the substrate extends from a first end of the cavity; and the plurality of cables extend from a second end of the cavity, opposite the first end of the cavity.

According to another aspect of the present application, a method of manufacturing a cable assembly is provided. The method comprises: mounting at least one cable connection module to a first surface of a paddle card, the mounting comprising: coupling a mounting end of at least one signal terminal of a cable connector to a pad of a first plurality of pads disposed on the first surface; and coupling a mounting arm of a ground terminal of the cable connector to a pad of a second plurality of pads disposed on the first surface; and fusing a cable wire to a wire attachment end of the at least one signal terminal, the wire attachment end comprising arm members extending away from the first surface of the paddle card and the cable wire being received therebetween.

In some embodiments, fusing the cable wire to the wire attachment end of the at least one signal terminal comprises fusing the cable wire to the wire attachment end using a laser.

In some embodiments, coupling the mounting end of the at least one signal terminal to the pad of the first plurality of pads comprises surface mount soldering the mounting end to the pad.

In some embodiments, coupling the mounting end of the ground terminal to the pad of the second plurality of pads comprises surface mount soldering the mounting end to the pad.

In some embodiments, mounting at least one cable connector module to the first surface comprises: mounting a plurality of cable connector modules to the first surface, the cable connector modules of the plurality of cable connector modules being disposed in a plurality of rows.

In some embodiments, coupling the mounting end of the at least one signal terminal to the pad of a first plurality of pads comprises coupling two mounting ends of two signal terminals to two pads of the first plurality of pads, each mounting end of the two mounting ends being coupled to a different pad of the two pads.

In some embodiments, fusing the cable wire to the wire attachment end comprises removing additional cable wire extending beyond a length of the wire attachment end.

In some embodiments, the method further comprises: forming the at least one cable connection module, by, for each cable connection module: molding a first insulative portion over the ground terminal; with the at least one signal terminal positioned adjacent the first insulative portion, molding a second insulative portion over the at least one signal terminal such that the ground terminal and the at least one signal terminal are held by the first and second insulative portions.

According to another aspect of the present application, a paddle card is provided. The paddle card comprises: a first surface comprising a first edge and a second edge, opposite the first edge; a plurality of contact pads in a row adjacent the first edge; and a plurality of footprint regions on the first surface, wherein: the plurality of footprint regions are disposed in a plurality of rows parallel to the second edge; each of the plurality of footprint region comprises: a pair of signal pads; and a ground pad.

In some embodiments, each of the plurality of footprint regions is configured for surface mounting of a cable connection module.

In some embodiments, each of the plurality of footprint regions further comprises a hole in the first surface configured to receive an engagement feature from the cable connection module.

In some embodiments, in each of the plurality of footprint regions the ground pad is between the pair of signal pads and the second edge.

In some embodiments, in each of the plurality of footprint regions the ground pad us U-shaped.

In some embodiments, in each of the plurality of footprint regions a centroid of the ground pad is aligned with a centroid of the pair of signal pads in a direction perpendicular to the second edge.

In some embodiments, in each of the plurality of footprint regions the ground pad is rectangular.

In some embodiments, the paddle card further comprises a plurality of traces; and the pair of signal pads in each of the plurality of footprint regions is connected via the plurality of traces to a respective pair of adjacent contact pads of the plurality of contact pads.

In some embodiments, the paddle card further comprises: a second surface, opposite the first surface; and a second plurality of footprint regions on the second surface, wherein: the second plurality of footprint regions are disposed in a plurality of rows parallel to the second edge; each of the second plurality of footprint region comprises: a pair of signal pads; and a ground pad.

In some embodiments, the paddle card further comprises: a plurality of cable connection modules, wherein a first subset of the plurality of cable connection modules are soldered to the plurality of footprint regions on the first surface, and a second subset of the plurality of cable connection modules are soldered to the second plurality of footprint regions on the second surface.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
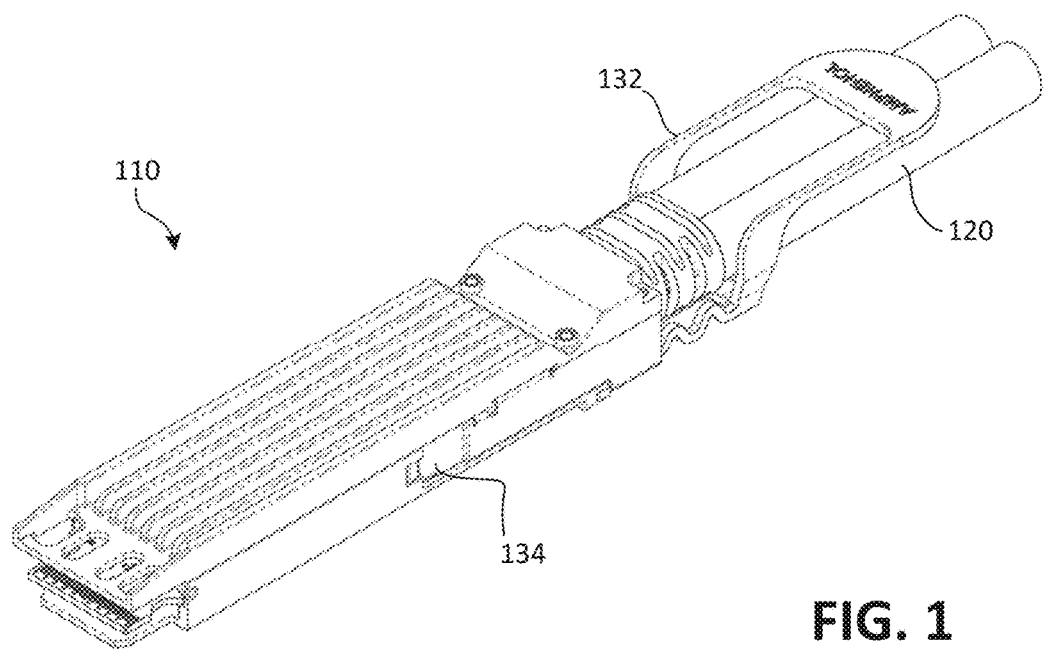
FIG. 1 is an isometric view of an exemplary cable connector including a plug connector terminating cables, in accordance with some embodiments of the technology described herein.

The inventors have recognized and appreciated structures for providing a high frequency cable assembly. The cable assembly may include one or more cable connection modules that facilitate termination of cables to a substrate within a connector with only small impact on signal integrity over a broad frequency range. Wires of the cables to be terminated may be coupled to signal terminals in the cable connection modules with joints that have only a small impact on signal integrity over a large bandwidth. Further, the cable connection modules may be mounted to the substrate at attachment locations that likewise have only a small impact on signal integrity. The cable connection modules further may have ground terminals coupled to the shields of the cables and the substrate to preserve signal integrity.

In some embodiments, wires of the cables may be coupled to a wire attachment end of signal terminals of the cable connection modules. The signal terminals may be shaped at one end to facilitate attachment of cable wires. The wire attachment end, for example, may be formed into a cradle that receives a wire of a cable between two arm members of the wire attachment end. With the wire in the cradle, the wire may be welded to the signal terminal, such as via laser welding. Laser welding may form a joint with a relatively small mass compared to a conventional soldering technique that requires the addition of conductive material. Moreover, laser welding may remove, such as through ablation, portions of the wire extending beyond the cradle, which would otherwise create a stub that could interfere with signal integrity through creation of reflections.

In some embodiments, mounting ends of the signal terminals of the cable connection modules may be coupled to pads on the substrate with high signal integrity joints. The coupling may be made through surface mount soldering techniques, for example, which may promote self-centering of the mounting ends of the signal and/or ground terminals of the cable connection modules on the pads on the surface of the substrate. Such an approach may enable the use of pads on the substrate that are smaller than pads conventionally used for attachment of cables to a substrate in a cable connector. The pads may be narrow and/or short, as either or both may provide desirable signal integrity, while still providing reliable manufacture of a cable assembly.

The pads on the substrate, for example, may be approximately the same width as the traces carrying signals within the substrate. In some embodiments, the pads may be on the order of 10 mm wide, such as having a width in a range from 8 mm to 12 mm. The pads also may be relatively short. Each pad may be approximately the same length as the mounting end of the signal or ground terminal that is attached to it. The pads, for example, may be less than 10%, 20%, 30% or 40% longer, in some embodiments, than then the length of the mounting end attached to it. Shorter pads may reduce stub resonances, which further increases the signal integrity of the connections.

Accordingly, cable connection modules may provide less degradation of signal integrity than might occur at an electrical and mechanical attachment of a cable wire to a substrate pad in a conventional cable assembly.

In some embodiments, the wire attachment ends may be spaced to match the spacing of conductors in a twinax cable being terminated. Use of cable connection modules, therefore, may enable cables using wires of any of multiple possible sizes to be terminated to a substrate without spreading of the wires of a cable. Avoiding spreading of the wires for termination can avoid introducing impedance changes or otherwise degrading signal integrity that might otherwise occur in a conventional cable termination. Alternatively or additionally, the spacing of the mounting ends of the signal terminals may be set to match pads on the substrate, regardless of the spacing of the wire attachment ends, enabling a substrate of single design to be used with wires of any of multiple possible sizes.

In some embodiments, cable connection modules may include ground terminals that contact shields of the terminated cables. Connections between the ground terminals and the cable shields, for example, may be formed through pressure contacts. Integration of the ground terminals in cable connection modules with signal terminals enables a small separation between the contact portions of the ground terminals and the wire attachment ends of the signal terminals. Such a structure may yield desirable signal integrity because the length of cable shield removed for termination may be relatively short. Such a configuration may limit the impact of any changes in impedance along the signal path between the cable and the substrate from stripping the shield from the cable.

In some embodiments, cables may be prepared for termination in an operation that enables the shield to extend substantially to the end of the cable insulator. A laser stripping operation may be used, for example. Moreover, the module may be configured such that the exposed end of the cable insulator is positioned in close proximity to the wire attachment ends of the signal terminals. As a result the length of cable wire extending out of the cable insulator at the terminated end of a cable can be relatively short, creating a signal pathway through the cable connection module in which the relative spacing between signal conductors of a pair is generally uniform and well controlled, as is the separation between signal terminals and the nearest ground structure. Such a configuration may yield a termination with high signal integrity, even for high frequency signals.

Such a cable connection module may be simply formed by embedding the ground and signal terminals in an insulative material. Either or both of the signal and ground terminals may be insert molded in an insulative housing. In some embodiments, the ground terminals may be embedded in an insulative housing in a first molding operation. The signal terminals may be integrated into the module in a second molding operation.

Such manufacturing techniques may lead to modules in which relative positioning of the signal and ground terminals is well controlled such that signal integrity is maintained through the cable connection module. The signal terminals may be accurately positioned for a uniform and desired impedance within the module, which may be achieved with edge coupling or broadside coupling. Moreover, the relative spacing of the signal terminals and ground conductor may also be set to provide a uniform and desired impedance. Further, the resulting cable connection modules may be handled using processing as is used to attach surface mount components to a printed circuit board.

Figure 2:
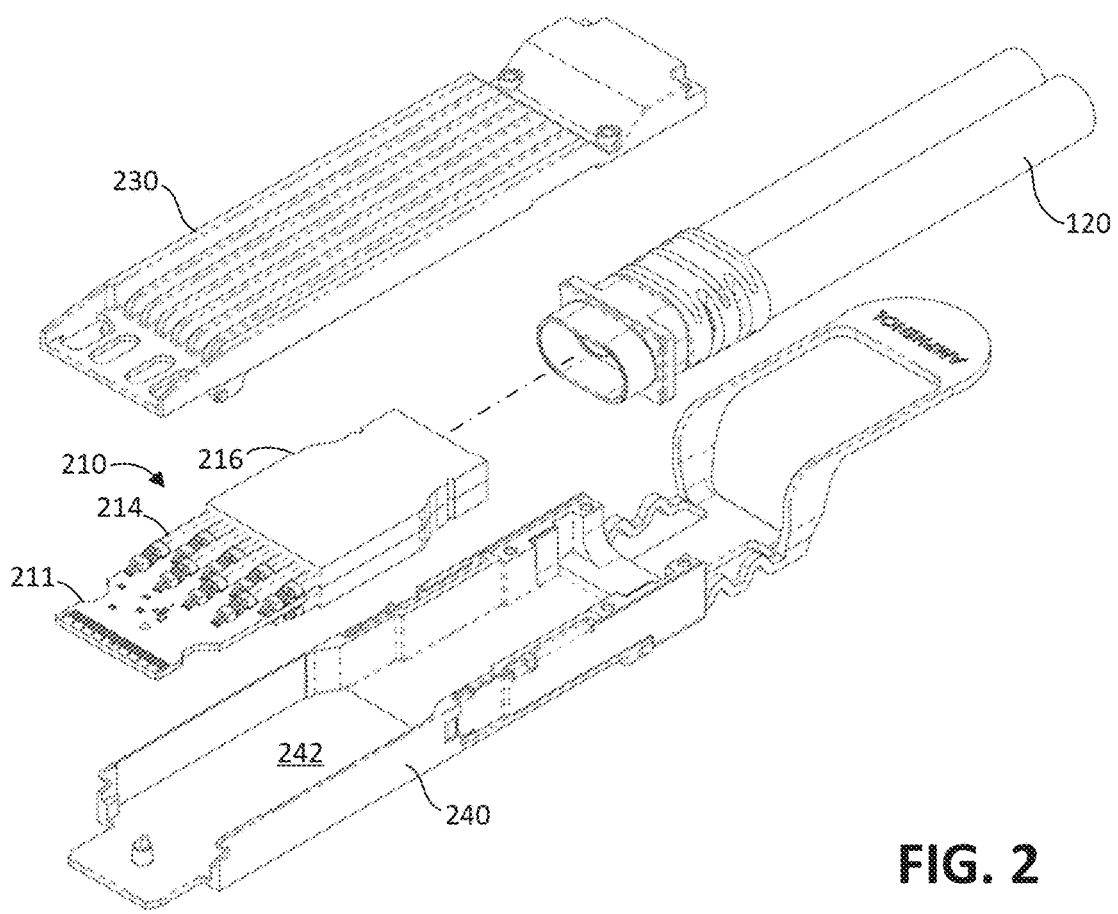
FIGS. 2 and 3 show disassembled views of the cable connector of FIG. 1, in accordance with some embodiments of the technology described herein.
Figure 3:
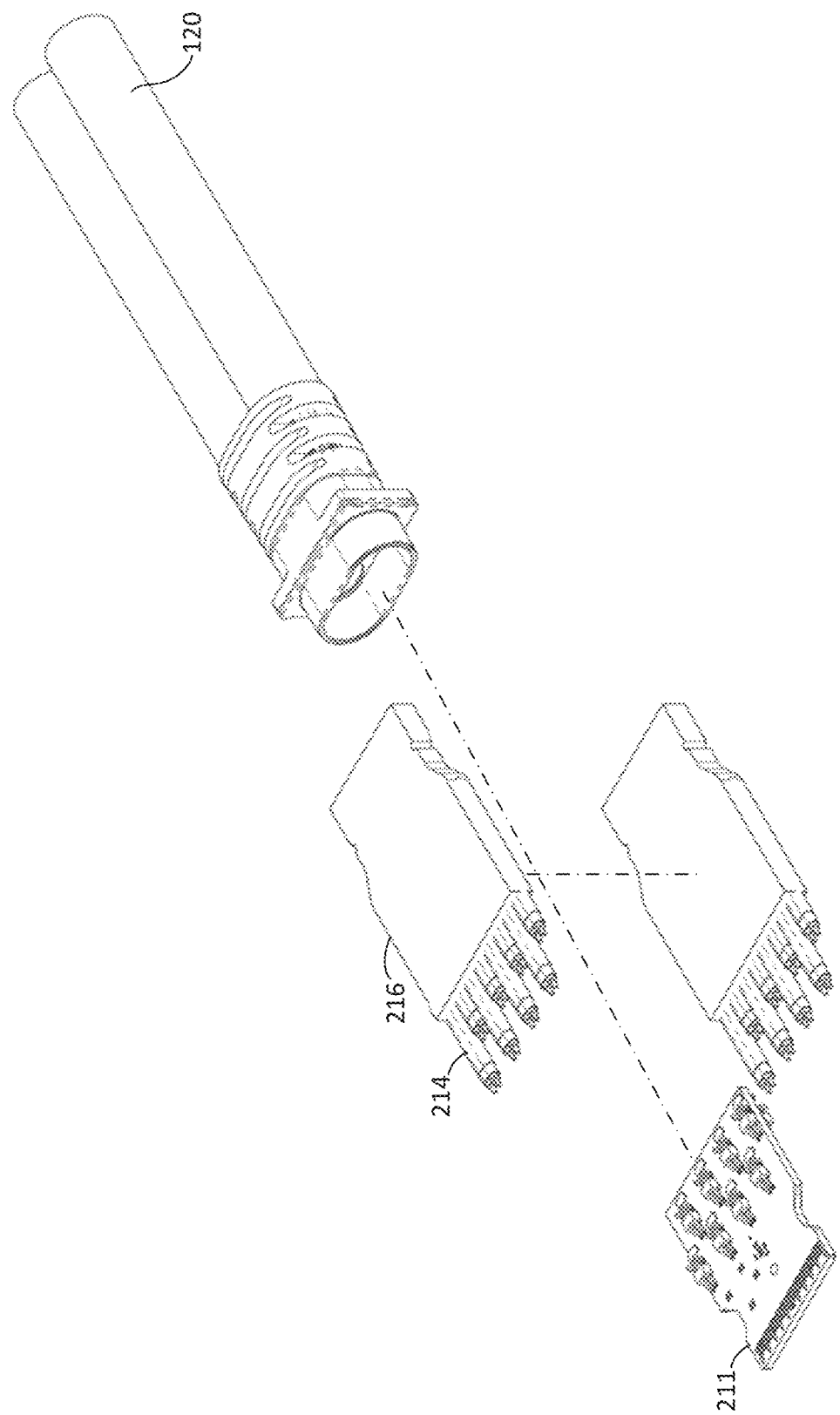

FIG. 1 shows an isometric view of an exemplary cable connector 110 including a plug connector terminating cables, and FIGS. 2 and 3 show various disassembled views of the cable connector 110, in accordance with some embodiments of the technology described herein. The cable connector 110 includes cable housing 120 which houses the cables 214. The cable connector 110 may further include a handle 132 to ease engagement and disengagement of the cable connector 110 from a mating connector (not shown).

In some embodiments, the cables 214 extend from the cable housing 120 and are routed to terminate in cable connection assembly 210. The cables 214 may terminate on one or more sides of substrate 211 of cable connection assembly 210. In some embodiments, the cables 214 may be routed such that a portion of cables 214 terminates on a first side of a substrate 211 of the cable connection assembly 210 and a portion of cables 214 terminates on an opposing second side of the substrate 211.

In some embodiments, the cable connector 110 includes a heat sink 230 disposed above an outer housing 240 and a cavity 242 of the outer housing 240. The heat sink 230 may be configured to secure the cable connection assembly 210 within the cavity 242 of outer housing 240. The cable connection assembly 210 may be disposed in the cavity 242 such that an edge of the substrate 211 of the cable connection assembly 210 protrudes from a mating edge of the cavity 242. The heat sink 230 may be disposed in contact with the cable connection assembly 210 (e.g., in contact with one of cable routing covers 216) to dissipate heat generated by the transmission of high-speed differential signals through the cable connector 110.

In some embodiments, the cable connector 110 includes a conductive shield 134 that is disposed on external surfaces of a portion of the outer housing 240. The conductive shield 134 is configured to further shield the cables 214 from electromagnetic interference as they are routed from cable housing 120 to their terminations in the cable connection assembly 210.

Figure 4A:
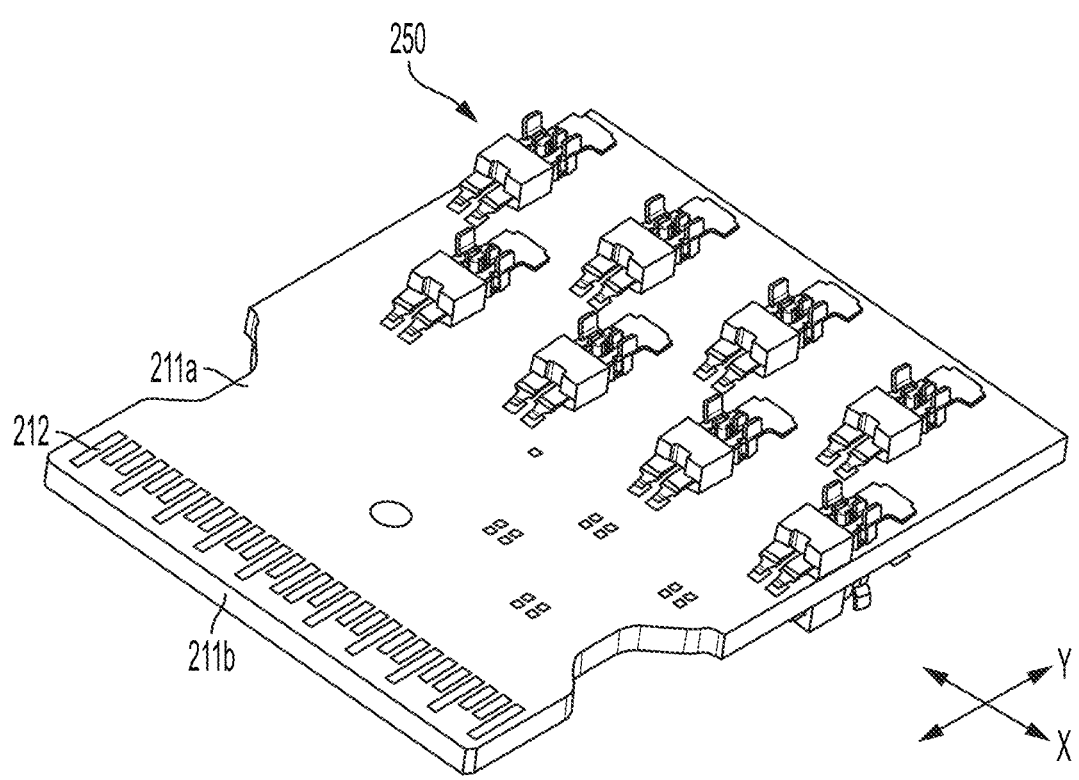
FIG. 4A shows an isometric view of a substrate including cable connection modules, in accordance with some embodiments of the technology described herein.
Figure 4B:
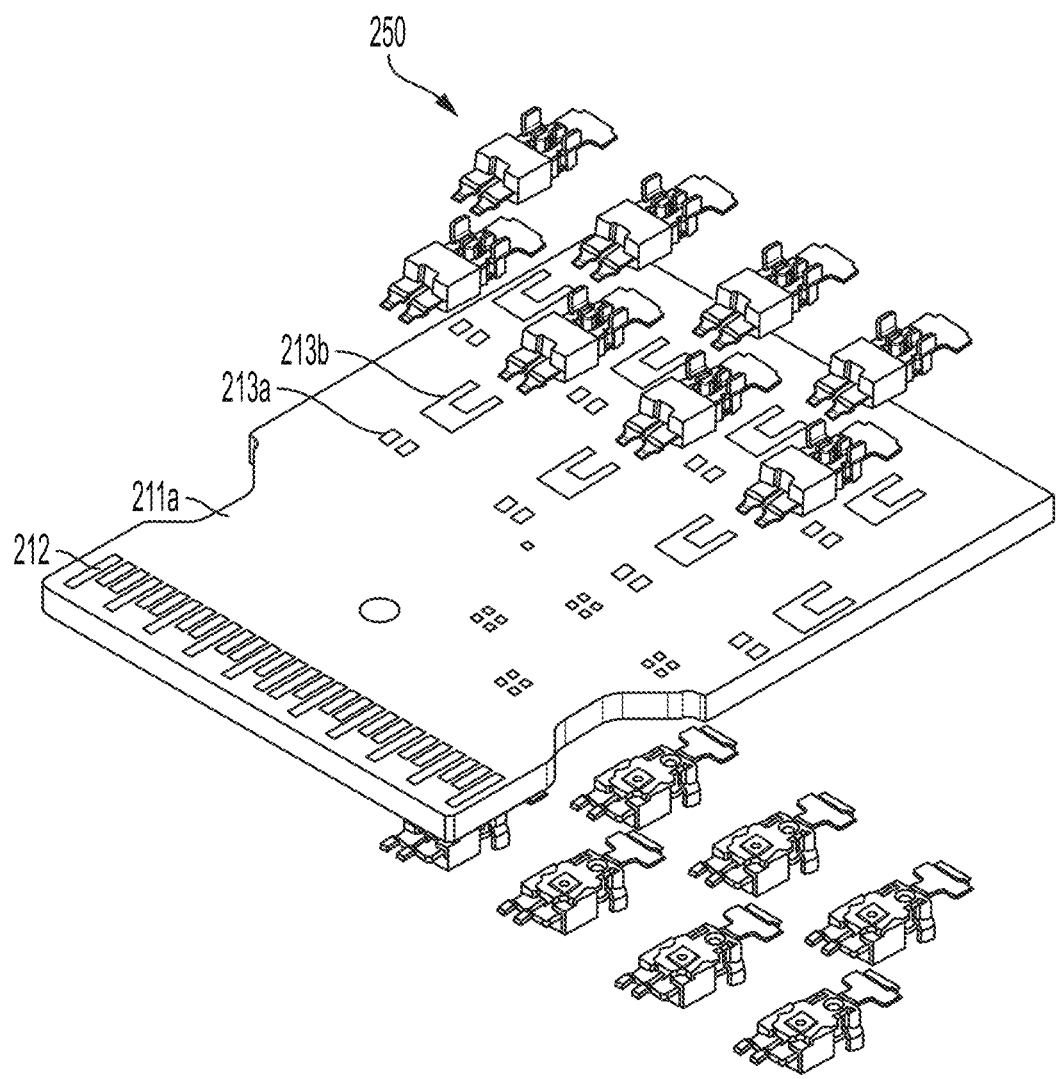
FIG. 4B shows an exploded view of the substrate and cable connection modules of FIG. 4A, in accordance with some embodiments of the technology described herein.

In some embodiments, the cable connection assembly 210 includes a substrate 211. FIG. 4A shows an isometric view of the substrate 211, and FIG. 4B shows an exploded view of the substrate 211, in accordance with some embodiments of the technology described herein. The substrate 211 (e.g., a paddle card, in some embodiments) includes a first surface 211a extending along the X- and Y-directions. Contact pads 212 are disposed on the first surface 211a near a front edge 211b of the substrate. The contact pads 212 are arranged in a row extending along the X-direction. The front edge 211b extends from a mating edge of the cable connector (e.g., from the cavity 242) such that contact pads 212 can electrically connect with terminals of a mating connector (not shown) when mated.

In some embodiments, the substrate 211 also includes signal pads 213a and ground pads 213b disposed on the first surface 211a of the substrate 211. In some embodiments, the signal pads 213a may be disposed in a first row extending parallel to the X-direction, and the ground pads 213b may be disposed in a second row extending parallel to the X-direction. The first row and the second row may be spaced apart along the Y-direction such that the signal pads 213a and the ground pads 213b are disposed in parallel, but offset, rows.

In some embodiments, the ground pads 213b may be aligned in the X-direction with one or more signal pads 213a. As shown in the example of FIG. 4B, the ground pads 213b may be aligned with a pair of signal pads 213a such that a centroid of the ground pads 213b may be aligned with a centroid of a pair of signal pads 213a in the X-direction. It should be appreciated that the ground pads 213b may be aligned with a centroid of one or more than two signal pads 213a, in some embodiments. In some embodiments, such as in the example of FIG. 4B, the ground pads 213b may U-shaped. In other embodiments, the ground pads 213b may be rectangular.

In some embodiments, cable connection modules 250 are mounted to pads of the signal pads 213a and ground pads 213b and disposed on the first surface 211a of the substrate 211. The cable connection modules 250 may terminate the cables 214, and electrical traces (not shown) formed in or on the substrate 211 may electrically connect the cables 214 to contact pads 212. The cables 214 may then be electrically connected to contact pads 212 through the cable connection modules 250, the signal pads 213a and/or the ground pads 213b, and the electrical traces present in or on the substrate 211.

In some embodiments, the substrate 211 has a second surface (not shown) opposite the first surface 211a. Additional contact pads 212, signal pads 213a, ground pads, and cable connection modules 250 may be disposed on the second surface of the substrate 211 to increase the signal routing density of the cable connection assembly 210.

Figure 5A:
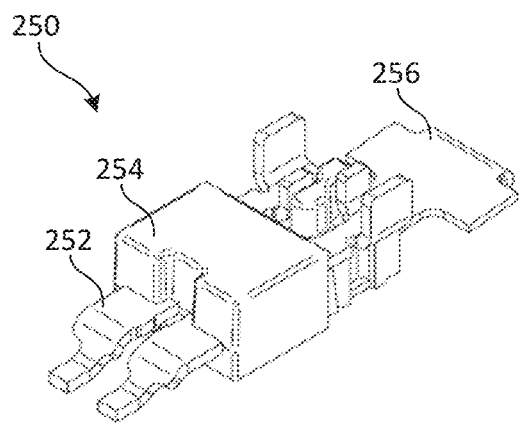
FIG. 5A shows an isometric view of an exemplary cable connection module of FIGS. 4A and 4B, in accordance with some embodiments of the technology described herein.
Figure 5B:
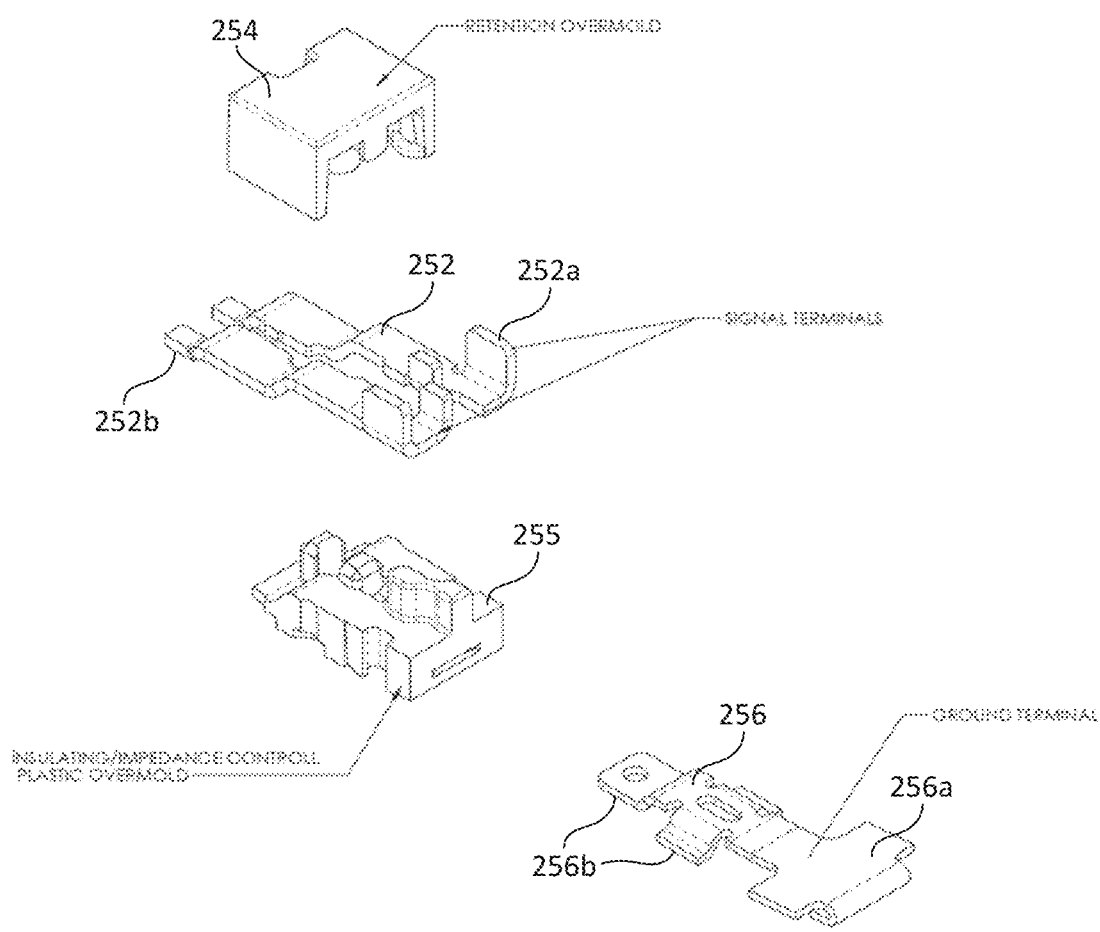
FIG. 5B shows an exploded view of the cable connection module of FIG. 5A, illustrating edge coupling of a pair of signal terminals within the module, in accordance with some embodiments of the technology described herein.

FIG. 5A shows an isometric view of a cable connection module 250, as described in connection with FIGS. 4A and 4B, and FIG. 5B shows an exploded view of the cable connection module 250, in accordance with some embodiments of the technology described herein. The cable connection module 250 includes signal terminals 252 and a ground terminal 256. The signal terminals 252 and ground terminal 256 are held in place by an insulative overmold 254 and supported internally by an insulative portion 255. When the cable connection module 250 is mounted to the substrate 211, the ground terminal 256 is disposed between the signal terminals 252 and the surface of the substrate 211. Additionally, as shown in the examples of FIGS. 5A and 5B, the cable connection module 250 may include a pair of signal terminals 252 arranged in an edge-coupled configuration, in some embodiments.

In some embodiments, a portion of the signal terminals 252 and a portion of the ground terminal 256 may be embedded in the insulative portion 255. In such embodiments, the insulative portion 255 may be formed around the embedded portions of the signal terminals 252 and ground terminals 256. For example, the insulative portion 255 and the overmold 254 may be formed by molding the components around the signal terminals 252 and the ground terminals 256, as described in connection with FIG. 11 herein.

In some embodiments, the signal terminals 252 include a wire connection end 252a and a mounting end 252b. The mounting end 252b is configured to be mounted to a pad of the signal pads 213a. The wire connection end 252a includes arm members extending away from the first surface 211a of the substrate 211 when the cable connection module 250 is mounted to the substrate 211. The arm members are configured to receive a cable wire 214a of a corresponding cable 214. The cable wire 214a is then fused to the wire connection end 252a of the signal terminals 252 to form an electrical and mechanical connection between the signal terminal 252 and the cable 214, as described in connection with FIGS. 6A and 6B herein.

In some embodiments, the ground terminal 256 includes a contact portion 256a and at least one mounting arm 256b. The contact portion 256a is configured for connection to a shield 214c of the cable 214, as described in connection with FIGS. 6A and 6B herein. In some embodiments, the contact portion 256a includes a compliant portion configured to create a pressure contact to the shield 214c of the cable 214.

In some embodiments, the mounting arms 256b are mounted to a pad or pads of the ground pads 213b. For example, the mounting arms 256b may be soldered to ground pads 213b. Alternatively, in some embodiments, the mounting arms 256b are compliant arms that are held in physical contact, forming pressure contacts, with the ground pads 213b.

Figure 5C:
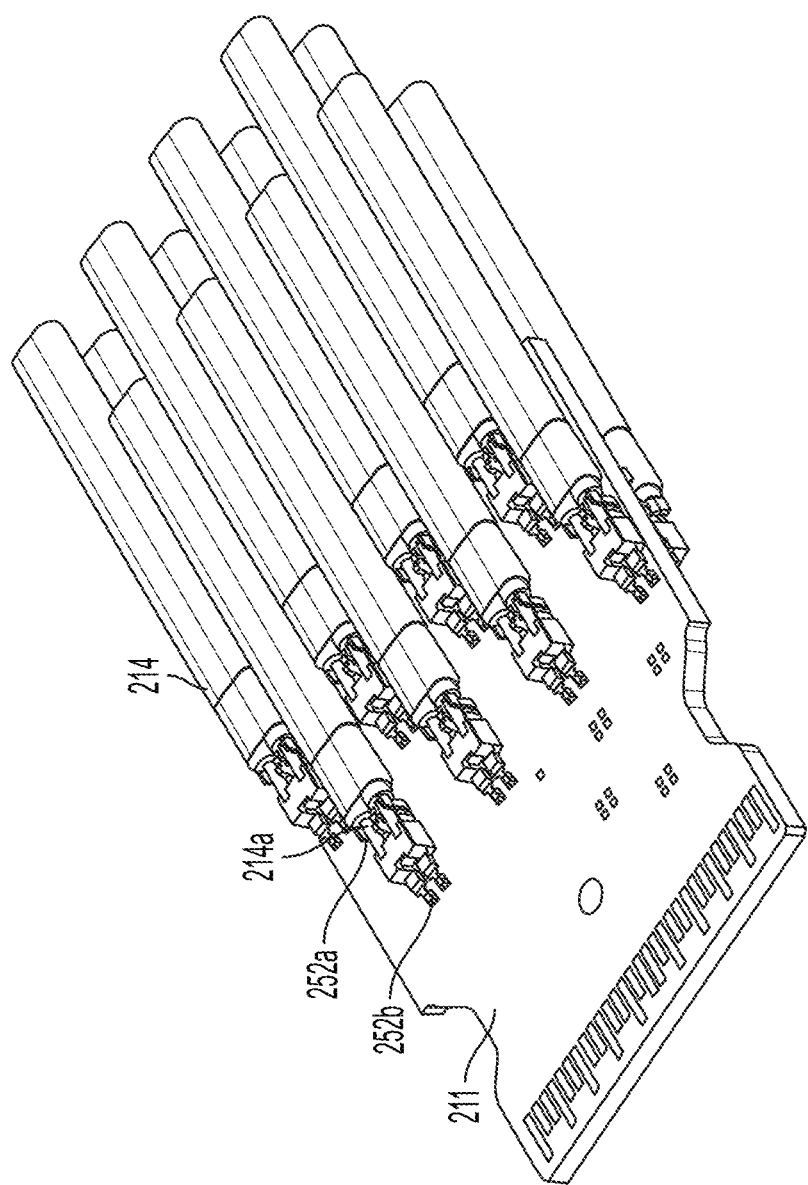
FIG. 5C shows an isometric view of twinax cables arranged such that conductors of the twinax cables are in contact with the signal terminals of the cable connection modules of FIGS. 5A and 5B, in accordance with some embodiments of the technology described herein.

FIG. 5C shows cables 214 arranged with cable wires 214a in contact with the wire attachment ends 252a of the signal terminals 252, in accordance with some embodiments of the technology described herein. The cables 214 are arranged as twinax cables, each twinax cable including a pair of cables 214. The cables 214 are arranged parallel to one another and disposed side-by-side across the substrate 211. Each cable wire 214a of the cables 214 is disposed between arm members of the wire attachment ends 252a and fused to the wire attachment ends 252a. The mounting ends 252b of the signal terminals 252 are mounted to signal pads 213a on the first surface 211a of the substrate 211.

Figure 6A:
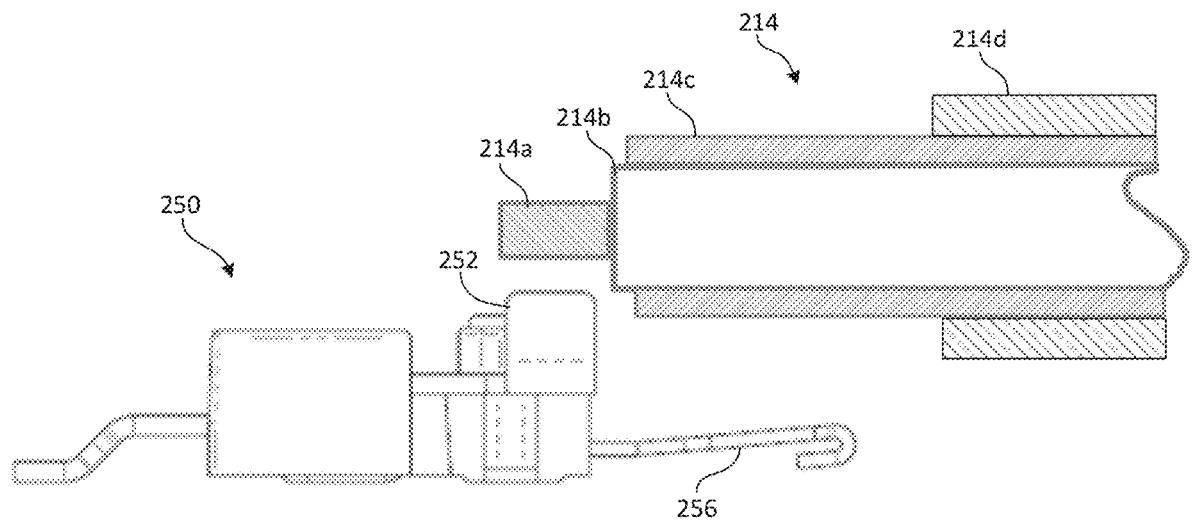
FIG. 6A shows a side view of a cable connection module of FIGS. 4A and 4B with a conductor of the cable prepared for termination by the cable connection module, in accordance with some embodiments of the technology described herein.
Figure 6B:
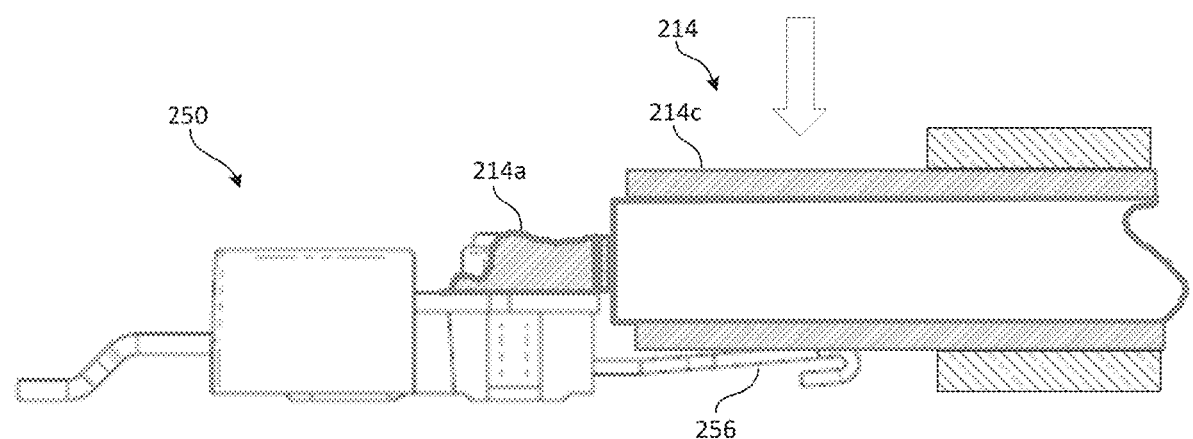
FIG. 6B shows a side view of the cable connection module and cable conductor of FIG. 6A with the conductor of the cable welded to a signal terminal of the cable connection module and a shield of the cable coupled to a ground terminal of the cable connection module, in accordance with some embodiments of the technology described herein.

FIG. 6A shows a side view of a cable connection module 250 with a cable wire 214a of the cable 214 prepared for termination by the cable connection module. FIG. 6B shows a side view of the cable connection module 250 and cable wire 214a with the cable wire 214a fused to a signal terminal 252 of the cable connection module 250 and a shield 214c of the cable 214 coupled to a ground terminal 256 of the cable connection module 250, in accordance with some embodiments of the technology described herein.

The cable 214 includes a cable wire 214a, an inner core 214b, a shield 214c, and an outer jacket 214d. The cable wire 214a is configured to carry the electrical signal, and the shield 214c is a conductive shield configured to shield the cable wire 214a from external electromagnetic interference (EMI). The inner core 214b electrically isolates the cable wire 214a from the shield 214c, and the outer jacket 214d insulates and protects the inner components of the cable 214.

To connect the cable 214 to the cable connection module 250, the cable wire 214a is positioned between the arm members of the wire connection end 252a of the signal terminal 252. The cable 214 may then be lowered and/or pressed down towards the substrate 211 so that the cable wire 214a is in contact with the signal terminal 252 and the shield 214c is placed in contact with the ground terminal 256, as shown in FIG. 6B. Thereafter, the cable wire 214a may be fused to the wire connection end 252a of the signal terminal 252. Extra material of the cable wire 214a extending past an edge of the wire connection end 252a may be removed by the fusing process so that little or no extra material of the cable wire 214a extends past the cradle of the wire connection end 252a, preventing a stub end from being formed. The shield 214c remains in electrical contact with the ground terminal due to the pressure applied by the compliant portion of the ground terminal on the shield 214c and/or due to downward pressure applied by a member of the cable connector 110.

Figure 7A:
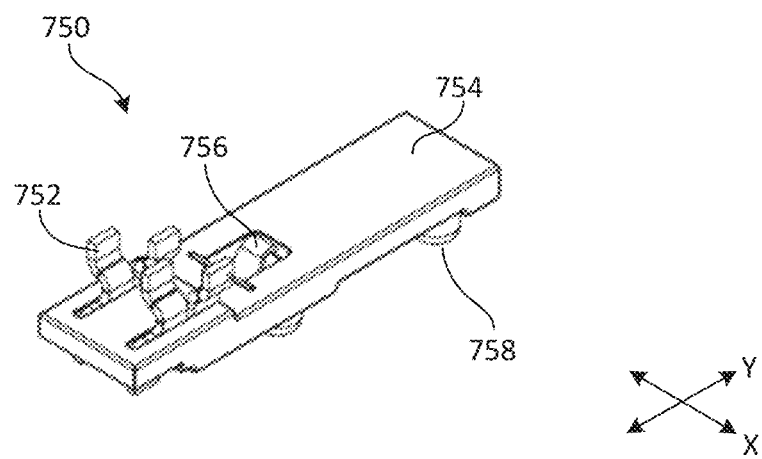
FIG. 7A shows an isometric view of an alternative embodiment of a cable connection module, in accordance with some embodiments of the technology described herein.
Figure 7B:
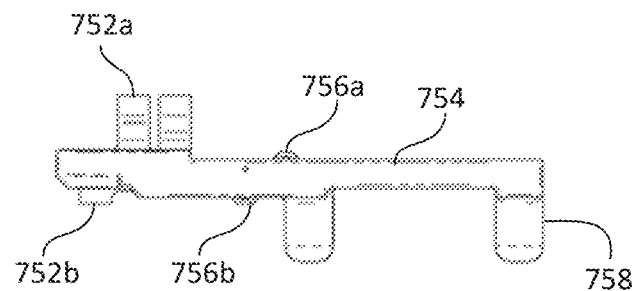
FIG. 7B shows a side elevation view of the cable connection module of FIG. 7A, in accordance with some embodiments of the technology described herein.
Figure 7C:
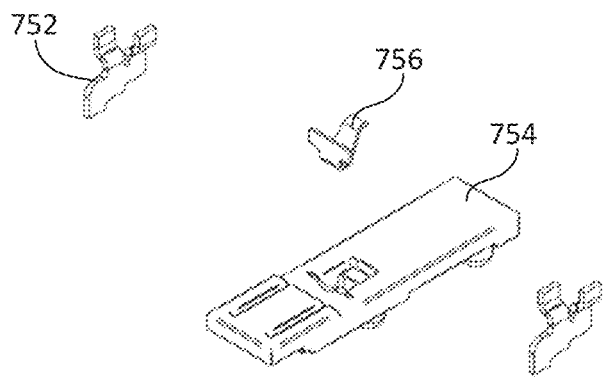
FIG. 7C shows an exploded view of the cable connection module of FIG. 7A, in accordance with some embodiments of the technology described herein.

FIG. 7A shows an isometric view of an alternative embodiment of a cable connection module 750. FIG. 7B shows a side elevation view of the cable connection module 750, and FIG. 7C shows an exploded view of the cable connection module 750, in accordance with some embodiments of the technology described herein. In some embodiments, the cable connection module 750 may replace the cable connection module 250 of FIGS. 1-6B.

The cable connection module 750 includes signal terminals 752 and a ground terminal 756 supported by an insulating body 754, in some embodiments. The insulating body includes additional engagement features 758 configured to be inserted into corresponding holes in the substrate 211 to ensure alignment of the signal terminals 752 and ground terminal 756 with corresponding signal pads 213a and ground pads 213b of the substrate 211.

In some embodiments, the signal terminal 752 include wire connection ends 752a and a mounting end 752b. The mounting end 752b may be configured to be mounted to a signal pad 213a of the substrate 211. For example, the mounting end 752b may be soldered to a signal pad 213a to form an electrical and mechanical connection to the signal pad 213a. The wire connection end 752a of the cable connection module 750 may be configured to receive and connect to a cable wire 214a. The wire connection end 752a may include arm members that extend away from the substrate 211 when the cable connection module 750 is mounted to the substrate 211.

In some embodiments, the arm members of the wire connection end 752a may be disposed adjacent one another along the Y-direction. As shown in the example of FIGS. 7A-7C, the arm members may include two arm members, each arm member bent opposite one another parallel to the X-direction so that the two arm members collectively form a cradle configured to receive a cable wire 214a between the arm members of the wire connection end 752a, as described in connection with FIG. 9 herein.

In some embodiments, the ground terminal 756 includes a connection end 756a and a mounting end 756b. The connection end 756a may be configured to make an electrical connection to the shield 214c of a cable 214. For example, the connection end 756a may be held in electrical connection with the shield 214c by a pressure connection caused by a compliant portion of the ground terminal 756 (e.g., such that the ground terminal 756 acts like a spring). The mounting end 756b may be configured to be mounted to a ground pad 213b of the substrate 211. For example, the mounting end 752b may be soldered to the ground pad 213b to form an electrical connection with the ground pad 213b.

Figure 8:
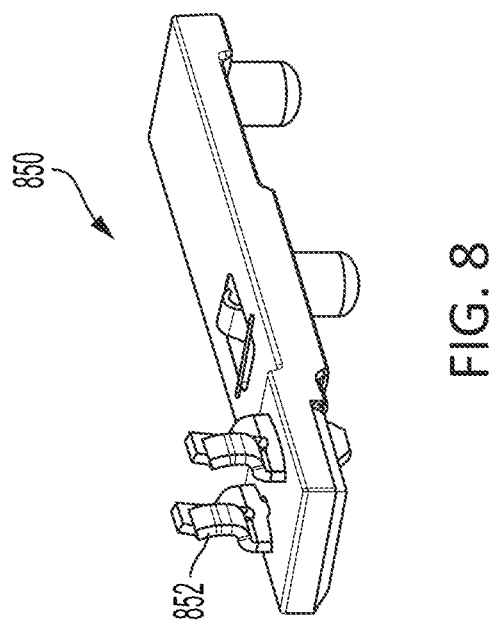
FIG. 8 shows an isometric view of an alternative embodiment of a cable connection module, in accordance with some embodiments of the technology described herein.

FIG. 8 shows an isometric view of an alternative embodiment of a cable connection module 850, in accordance with some embodiments of the technology described herein. The cable connection module 850 is similar to the cable connection module 750 described in connection with FIGS. 7A-7C but includes alternative embodiments of signal terminals 852. Signal terminals 852 may include mounting ends extending straight downwards toward the substrate 211 when the cable connection module 850 is mounted to the substrate 211. This alternative embodiment reduces a length of the signal terminals 852 along the Y-direction, thereby reducing the size of a footprint of the cable connection modules 850.

Figure 9:
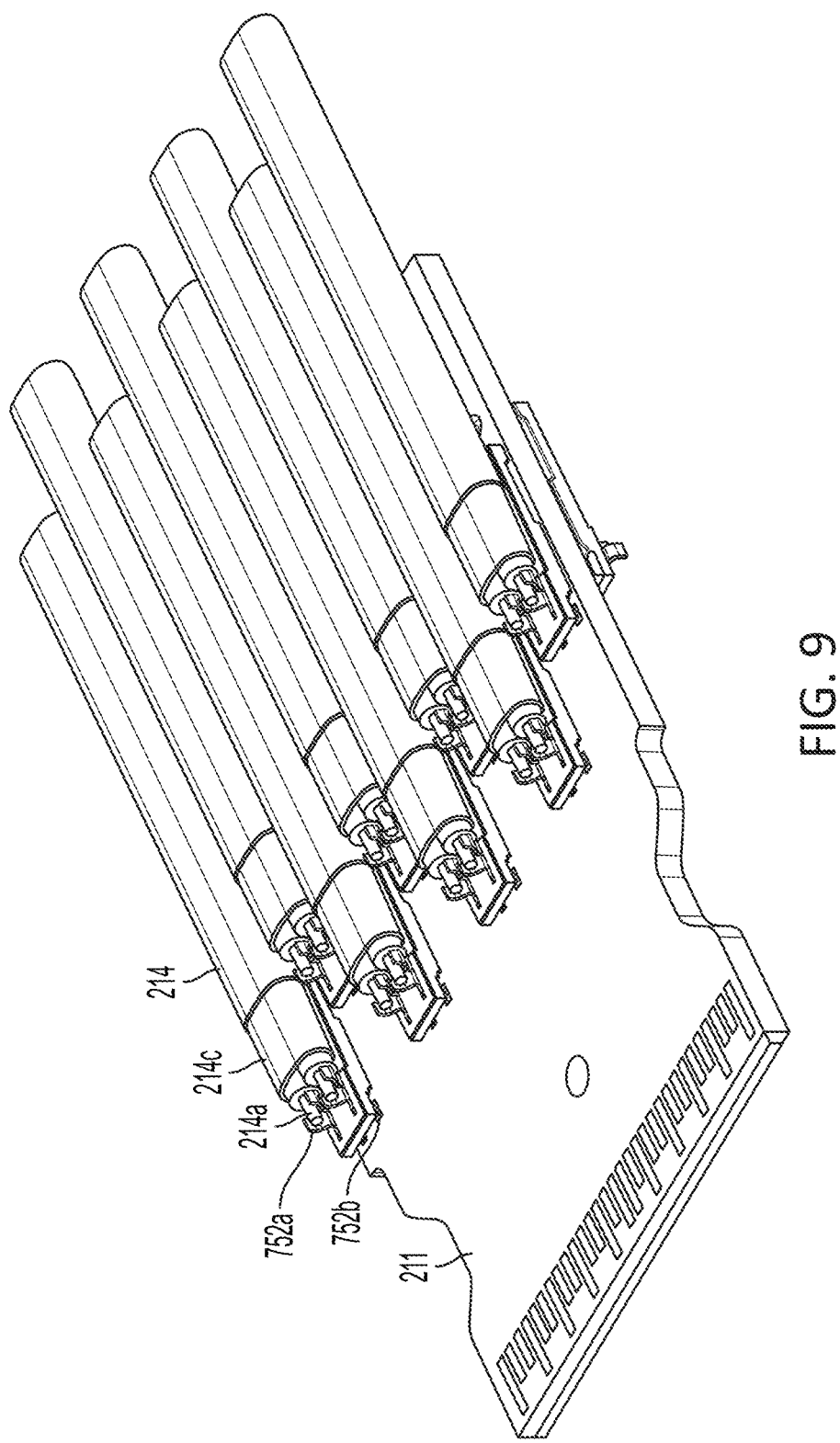
FIG. 9 shows an isometric view of twinax cables arranged such that conductors of the twinax cables are in contact with the signal terminals of the cable connection modules of FIGS. 7A-7C, in accordance with some embodiments of the technology described herein.

FIG. 9 shows an isometric view of substrate 211 with cable connection modules 750 and cables 214 connected thereto, in accordance with some embodiments of the technology described herein. The cables 214 are arranged as twinax cables, each twinax cable including a pair of cables 214. The cables 214 are arranged parallel to one another and disposed side-by-side across the substrate 211. Each cable wire 214a of the cables 214 is disposed between arm members of the wire attachment ends 752a and fused to the wire attachment ends 752a. The mounting ends 752b of the signal terminals 752 are mounted to signal pads 213a on the first surface 211a of the substrate 211. The shield 214c is also placed in electrical contact with the ground terminal 756 of the cable connection module 750.

Figure 10:
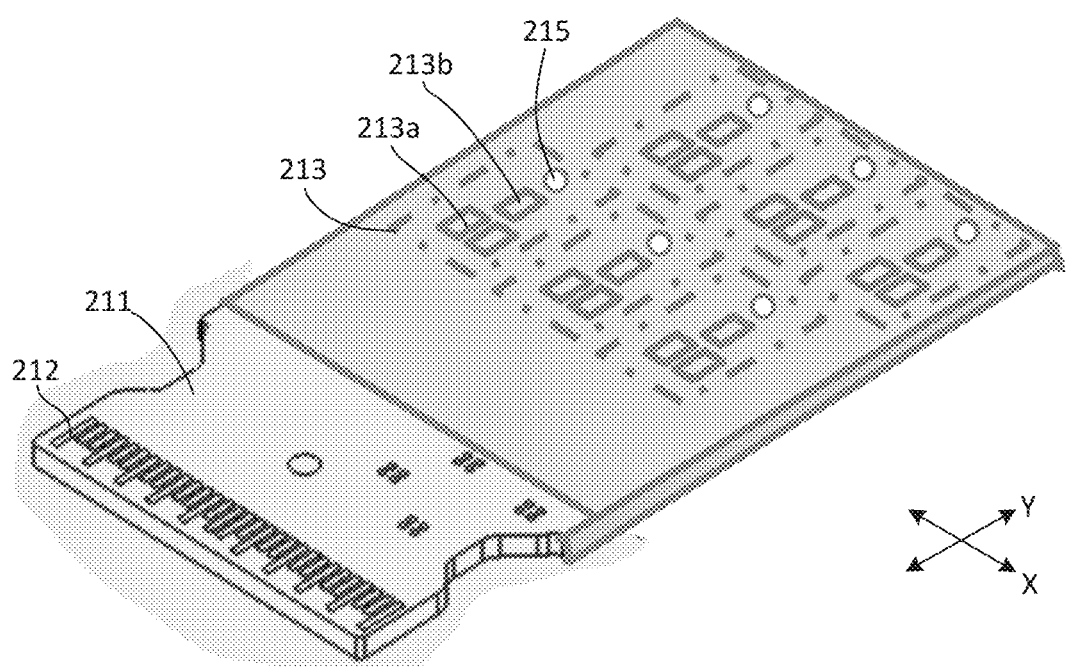
FIG. 10 is an isometric view of an illustrative embodiment of a substrate for a high speed cable connector, in accordance with some embodiments of the technology described herein.

FIG. 10 is an isometric view of an illustrative embodiment of a substrate 211 for a high speed cable connector, in accordance with some embodiments of the technology described herein. The substrate 211 may be a paddle card that includes contact pads 212 disposed at a front edge 211b of the substrate. The contact pads 212 may be configured to make electrical contact with portions of a mating connector (not shown).

In some embodiments, the substrate 211 may also include footprint regions 213 disposed in a plurality of rows that extend parallel to the front edge 211b (e.g., parallel to the X-direction). The footprint regions 213 may each include signal pads 213a, ground pads 213b, and one or more holes 215. The signal pads 213a and/or the ground pads 213b may be electrically connected to the contact pads 212 by traces (not shown) formed on the substrate 211. The one or more holes 215 may be configured to receives an engagement feature from the cable connection module (e.g., engagement feature 758 of cable connection module 750) to assist in alignment of the cable connection module with the signal pads 213a and ground pads 213b.

Figure 11:
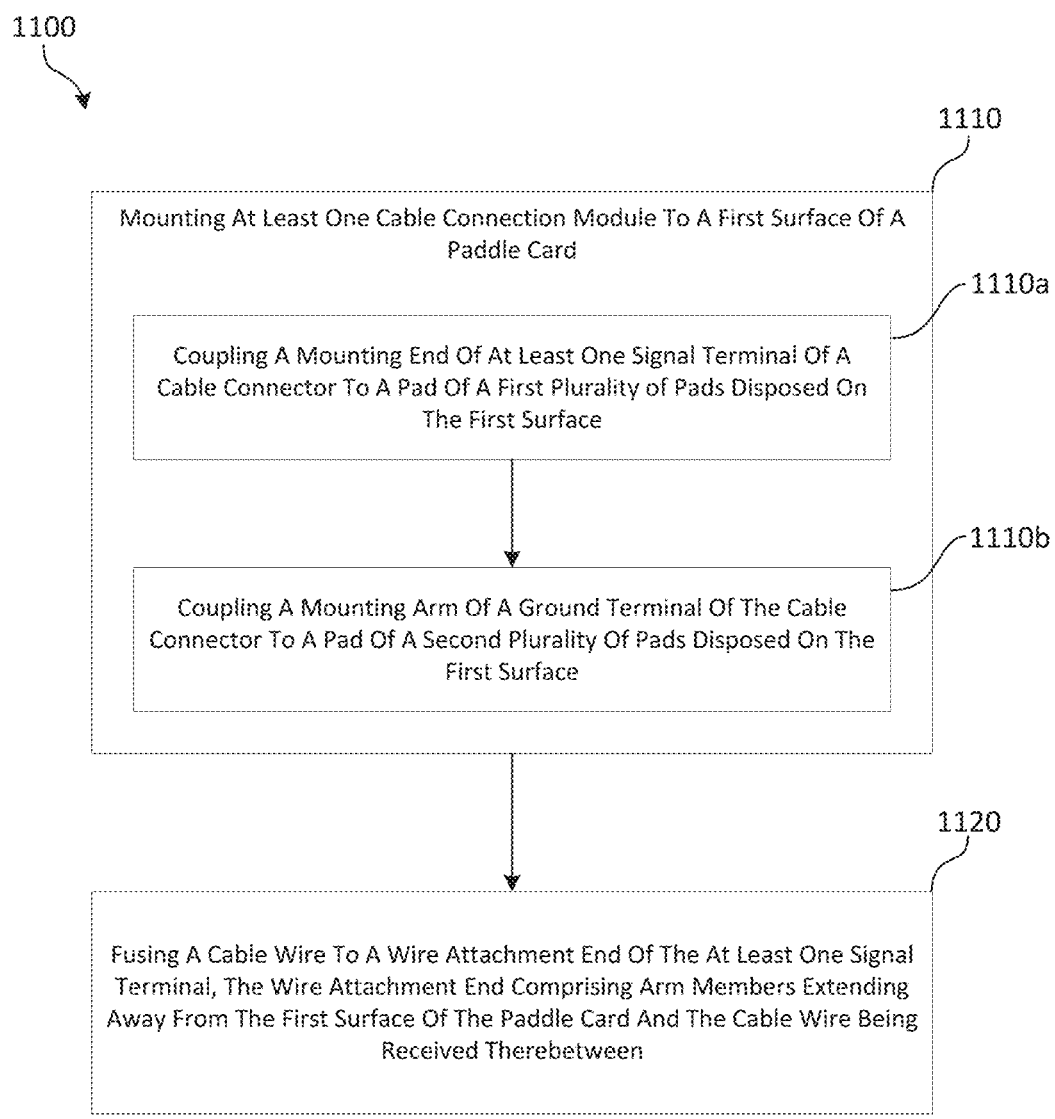
FIG. 11 is a flowchart describing a process 1100 of manufacturing a cable assembly, in accordance with some embodiments of the technology described herein.

FIG. 11 is a flowchart describing a process 1100 of manufacturing a cable assembly, in accordance with some embodiments of the technology described herein. Process 1100 may optionally begin by forming the cable connection modules (not shown). Forming the cable connection modules may include, for each module, molding a first insulative portion over a ground terminal (e.g., by injection molding). Thereafter, with the at least one signal terminal positioned adjacent the first insulative portion, a second insulative portion may be molded over the at least one signal terminal such that the ground terminal and the at least one signal terminal are held by the first and second insulative portions.

After forming the cable connection modules, process 1100 may proceed or begin at act 1110, where at least one cable connection module is mounted to a first surface of a paddle card. Mounting the at least one cable connection module may be performed by a combination of sub-acts 1110a and 1110b. In sub-act 1110a, a mounting end of at least one signal terminal of the at least one cable connection module may be mounted to a pad of a first plurality of pads (e.g., signal pads) disposed on a first surface of the paddle card. Mounting the mounting end of the at least one signal terminal may include surface-mount soldering the mounting end to the pad of the first plurality of pads.

Thereafter, in sub-act 1110b, a mounting arm of a ground terminal of the cable connection module may be coupled to a pad of a second plurality of pads (e.g., ground pads) disposed on the first surface of the paddle card. In some embodiments, coupling the mounting arm of the ground terminal to the ground pad may comprise surface-mount soldering the mounting arm to the ground pad. In other embodiments, coupling the mounting arm of the ground terminal to the ground pad may comprise forming a pressure connection between the mounting arm and the ground pad.

After mounting the at least one cable connection module to the paddle card, process 1100 may proceed to act 1120. In act 1120, a cable wire may be fused to a wire attachment end of the at least one signal terminal. The wire attachment end may comprise arm members extending away from the first surface of the paddle card, and the cable wire may be received between the arm members of the wire attachment end. In some embodiments, fusing the cable wire to the at least one signal terminal may include using a laser to laser weld the cable wire to the at least one signal terminal. Additionally, fusing the cable wire to the at least one signal terminal may include removing additional cable wire extending beyond a length of the wire attachment end to prevent a stub end from being formed.

The disclosed technology is not limited in its application to the details of construction and the arrangement of components set forth in the preceding description or as illustrated in the drawings. The disclosed technology is capable of other embodiments and of being practiced or of being carried out in various was. Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art.

For example, multiple cable connection modules, each terminating a cable, are shown mounted to surfaces of a paddle card. In other embodiments, a cable connection module may include an insulative portion holding signal and ground terminals for terminating multiple cables. One cable termination module, for example, may be provided for each row of cable connection modules illustrated in FIG. 4A.

Such alterations, modifications, and improvements are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A cable assembly, comprising:
   a plurality of cables, each of the plurality of cables comprising at least one wire and a shield; and
   a connector terminating the plurality of cables, the connector comprising:
      a substrate comprising a plurality of first pads and a plurality of second pads; and
      a plurality of connection modules mounted on the substrate and coupled to a respective cable of the plurality of cables, wherein:
         each of the plurality of connection modules comprises at least one first terminal and a second terminal;
         a first end of each of the at least one first terminals is coupled to a respective first pad of the plurality of first pads;
         a first end of the second terminal is coupled to a respective second pad of the plurality of second pads;
         a second end of each of the at least one first terminals is coupled to a respective wire of the at least one wire of the respective cable;
         a second end of the second terminal is coupled to the shield of the respective cable; and
         a member of the cable assembly applies a force to the respective cable to cause the shield of the respective cable to be electrically coupled to the respective second pad by a pressure connection, the force being in a direction towards the substrate.

2. The cable assembly of claim 1, wherein the substrate is a paddle card comprising a plurality of contact pads disposed along an edge thereof.

3. The cable assembly of claim 1, wherein pads of the plurality of first pads are signal pads, and pads of the plurality of second pads are ground pads.

4. The cable assembly of claim 1, wherein:
   each of the plurality of cables comprises two wires and the shield surrounds the two wires; and
   each of the plurality of connection modules comprises two first terminals.

5. The cable assembly of claim 1, wherein:
   each of the plurality of connection modules further comprises an insulative portion holding the at least one first terminal and the second terminal.

6. The cable assembly of claim 5, wherein:
   each of the plurality of connection modules comprises an engagement feature extending from the insulative portion and into a hole in the substrate.

7. The cable assembly of claim 5, wherein:
   for each of the plurality of connection modules, the first end of each of the at least one first terminals is electrically and mechanically coupled to a respective first pad of the plurality of first pads.

8. The cable assembly of claim 5, wherein for each of the plurality of connection modules:
   the at least one first terminals is a pair of first terminals; and
   the first end of each of the pair of first terminals is soldered to a respective first pad of the plurality of first pads.

9. The cable assembly of claim 8, wherein for each of the plurality of connection modules:
   the second end of the second terminal is coupled to the shield of the respective cable by pressing against the shield.

10. The cable assembly of claim 9, wherein for each of the plurality of connection modules:
    the first end of the second terminal is coupled to the respective second pad of the plurality of second pads by pressing against the respective second pad.

11. The cable assembly of claim 9, wherein for each of the plurality of connection modules:
    the first end of the second terminal is soldered to the respective second pad of the plurality of second pads.

12. The cable assembly of claim 1, wherein the second end of each of the at least one first terminals comprises arm members extending away from a first side or a second side of the substrate, the arm members being configured to receive a wire of a cable therebetween.

13. The cable assembly of claim 1, wherein the second terminal is disposed between the at least one first terminals and a first side or a second side of the substrate.

14. A cable assembly, comprising:
    a plurality of cables, each of the plurality of cables comprising at least one wire and a shield; and
    a connector terminating the plurality of cables, the connector comprising:
       a substrate comprising a plurality of first pads and a plurality of second pads; and
       a plurality of connection modules mounted on the substrate and coupled to a respective cable of the plurality of cables, wherein:
          each of the plurality of connection modules comprises at least one first terminal and a second terminal;
          a first end of each of the at least one first terminals is coupled to a respective first pad of the plurality of first pads;
          a first end of the second terminal is coupled to a respective second pad of the plurality of second pads;

a second end of each of the at least one first terminals is coupled to a respective wire of the at least one wire of the respective cable;

a second end of the second terminal is coupled to the shield of the respective cable;

the substrate comprises a first side and a second, opposite, side; and a first subset of the plurality of connection modules are mounted to the first side and a second subset of the plurality of connection modules are mounted to the second side.

15. The cable assembly of claim 14, wherein:

the connector further comprises an outer housing enclosing a cavity;

the substrate:
is disposed within the cavity; and
comprises a plurality of contact pads disposed along a first edge of the substrate;

the first edge of the substrate extends from a first end of the cavity; and the plurality of cables extends from a second end of the cavity, opposite the first end of the cavity.

16. A method of manufacturing a cable assembly, the method comprising:

mounting at least one cable connection module to a first surface of a paddle card, the mounting comprising:

coupling a mounting end of at least one signal terminal of a cable connector to a pad of a first plurality of pads disposed on the first surface;

coupling a mounting arm of a ground terminal of the cable connector to a pad of a second plurality of pads disposed on the first surface;

fusing a cable wire to a wire attachment end of the at least one signal terminal; and forming a pressure connection between a shield of the cable wire and the mounting arm of the ground terminal by applying, using a member of the cable assembly, a force to the shield of the cable wire, the force being in a direction towards the first surface.

17. The method of claim 16, wherein fusing the cable wire to the wire attachment end of the at least one signal terminal comprises fusing the cable wire to the wire attachment end using a laser.

18. The method of claim 16, further comprising:

forming the at least one cable connection module, by, for each cable connection module:

molding a first insulative portion over the ground terminal;

with the at least one signal terminal positioned adjacent the first insulative portion, molding a second insulative portion over the at least one signal terminal such that the ground terminal and the at least one signal terminal are held by the first and second insulative portions.

19. A method of manufacturing a cable assembly, the method comprising:

mounting at least one cable connection module to a first surface of a paddle card, the mounting comprising:

coupling a mounting end of at least one signal terminal of a cable connector to a pad of a first plurality of pads disposed on the first surface; and coupling a mounting arm of a ground terminal of the cable connector to a pad of a second plurality of pads disposed on the first surface; and fusing a cable wire to a wire attachment end of the at least one signal terminal, the wire attachment end comprising arm members extending away from the first surface of the paddle card and the cable wire being received therebetween, wherein:

fusing the cable wire to the wire attachment end comprises removing additional cable wire extending beyond a length of the wire attachment end.

\* \* \* \* \*